Sept. 9, 1924.                                                      1,507,610
E. W. LADD
COLLAR BUTTON
Filed July 19, 1922

Ernest W. Ladd
Inventor

By his Attorney

Patented Sept. 9, 1924.

1,507,610

UNITED STATES PATENT OFFICE.

EARNEST W. LADD, OF NEW YORK, N. Y.

COLLAR BUTTON.

Application filed July 19, 1922. Serial No. 576,037.

*To all whom it may concern:*

Be it known that I, EARNEST W. LADD, a citizen of the United States, residing in the borough of Manhattan, city, county, and State of New York, have made certain new and useful Improvements in Collar Buttons, of which the following is a specification, reference being had to the accompanying drawings, which form a part of the same.

The principal object of my invention is to enlarge the collar band of shirts or other garments where the collar band is too small for comfortable wear, and at the same time dispose the head of the collar button so as to hold in normal position the over-lapping ends of collars that may be worn with such shirt or garment.

Referring now in detail to the drawings, 5 represents the body of a shirt, 6 the collar band thereof and 7 a collar. The base of the collar button is shown at 8, the head at 9 and the shank at 10.

The shank 10, on which the base 8 and head 9 are mounted, is elongated laterally between the base and head so as to link together the ends of the collar band preferably in such manner as to maintain them in substantially the same plane, the shank being so constructed that the position of the head 9 and that part of the shank connected therewith is in normal position for attaching a collar thereto.

Figure 2:
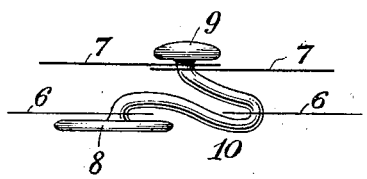
Fig. 2 is a side view of my collar button showing the same in position in a shirt and collar fastened thereon.
Figure 3:
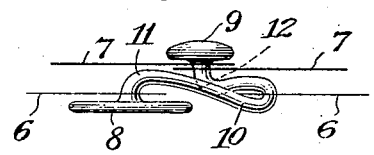
Fig. 3 is a similar view to that shown in Fig. 2, the collar button being shown in modified form.
Figure 4:
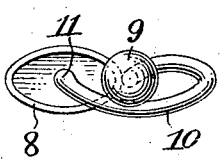
Fig. 4 is a plan view of the collar button shown in Fig. 3 looking at the same from the top.

In Figs. 3 and 4 a modification of the collar button shown in Fig. 2 is shown. This latter structure is designed to bring the base 8 and head 9 in closer parallel planes to each other. For this purpose the bending of the shank 10 is given an additional curve to that shown in Fig. 2 so as to draw the base 8 and head 9 into closer parallel planes to each other. In Fig. 2 the shank is shown bent in a single plane whereas in Figs. 3 and 4 the shank is given an arcuate position between the bend 11 near the end of the shank attached to the base, and the bend 12 shown in part by a dotted curved line where the other end of the shank is attached to the head of the collar button. In Fig. 4 I have shown the base 8 of my collar button to be of oval form to facilitate the insertion of the base into one of the button holes of a collar band.

Figure 1:
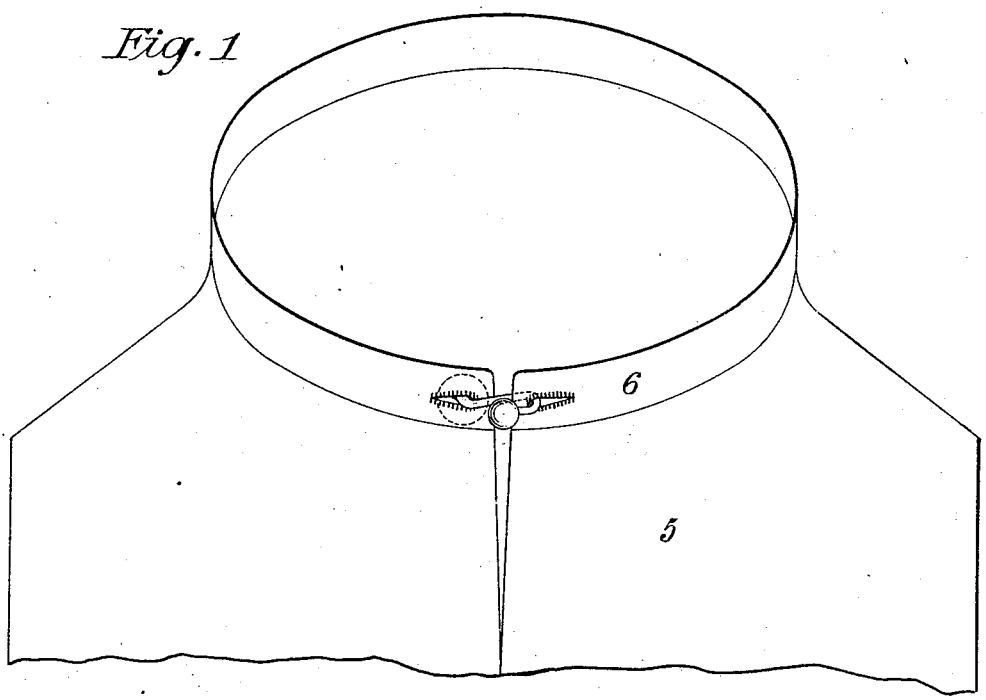
Fig. 1 is a fragmentary view of a shirt showing the collar band held in closed but expanded position by the use of my collar button.

My collar button may be inserted in position in the usual way by inserting the head first. This being done the shank is manipulated through the collar band until the base of the collar button is adjacent to the collar band. The collar button may then be inserted by passing the other button hole of the collar band over the head of the collar button or the first attachment may be made by inserting the base of the collar button through the collar button hole. Where this method of attachment is used it is preferable to use a collar button having the oval or elongated base shown in Fig. 4. The collar button now being in position in one end of the collar band the other end of the collar band is buttoned over the head of the collar button and the collar band and collar button then occupy the relative position to each other shown in Fig. 1. It will be noted that the head of the collar button occupies a central position between the ends of the collar band. The collar button being in this position, a collar is fastened on to the collar button in the usual way as shown in Figs. 2 and 3, the collar in said figures being represented by the numeral 7, and the appearance of the collar in place on the collar button is similar to the appearance of a collar used in connection with the conventional straight shanked collar button.

It is obvious that many modifications may be made in the shape of the shank without departing from the spirit of my invention. It is not my desire therefore to be confined in patent protection to the form shown and described but what I wish to cover by Letters Patent is set forth in the appended claims.

Claims:

1. In a collar button, a base, a head and a shank, the shank being bent laterally from the base in a slightly inclined plane and returned in an upward direction and again bent so as to form a stud for collars to be buttoned thereon.

2. In a collar button, a base, a head and a shank the shank being bent laterally from the base in a slightly inclined plane and returned in an upward direction and again bent so as to form a stud for collars to be buttoned thereon, the collar band connecting points of said shank being disposed in substantially the same plane.

3. In a collar button, a base, a head and a shank, the shank being bent laterally from the base in a slightly inclined plane and returned in an upward direction and again bent so as to form a stud for collars to be buttoned thereon, the head being centrally disposed between the collar band connecting points of the shank.

4. In a collar button, a base, a head and a shank, the shank being bent laterally from the base in a slightly inclined plane and returned in an upward direction and again bent so as to form a stud for collars to be buttoned thereon, the head being centrally disposed between the collar band connecting points of the shank and in a horizontal line therewith.

5. A device of the class described comprising a collar button base, an elongated shank on said base extending laterally therefrom and formed into a hook, the end of said shank being turned upwardly and provided with a button head, said button head being located substantially centrally between said button base and said hook substantially as described.

EARNEST W. LADD.